United States Patent
Keller et al.

(10) Patent No.: US 6,737,614 B2
(45) Date of Patent: May 18, 2004

(54) METHOD OF CHECKING A DEVICE FOR INFLUENCING THE TEMPERATURE IN THE COOKING SPACE OF A BAKING OVEN AND CORRESPONDING BAKING OVEN

(75) Inventors: Martin Keller, Traunreut (DE); Manfred Plankl, Traunreut (DE); Michael Ulmer, Traunreut (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/331,925

(22) Filed: Dec. 30, 2002

(65) Prior Publication Data

US 2003/0094449 A1 May 22, 2003

Related U.S. Application Data

(63) Continuation of application No. PCT/EP01/07179, filed on Jun. 25, 2001.

(30) Foreign Application Priority Data

Jun. 28, 2000 (DE) .......................................... 100 31 496

(51) Int. Cl.[7] .................................................. H05B 1/02
(52) U.S. Cl. ........................ 219/494; 219/481; 219/412; 219/497; 219/506; 99/342; 99/331
(58) Field of Search .......................... 219/680, 411–413, 219/494, 481, 497, 506, 501, 491; 392/416; 99/339, 342, 331, 325

(56) References Cited

U.S. PATENT DOCUMENTS

| | | | |
|---|---|---|---|
| 5,332,886 A | | 7/1994 | Schilling et al. |
| 5,688,422 A | * | 11/1997 | Landwehr et al. .......... 219/491 |
| 5,711,606 A | | 1/1998 | Koether |
| 5,723,846 A | | 3/1998 | Koether et al. |
| 6,133,555 A | * | 10/2000 | Brenn ........................ 219/497 |
| 6,528,772 B1 | * | 3/2003 | Graves et al. .............. 219/680 |

FOREIGN PATENT DOCUMENTS

| | | |
|---|---|---|
| DE | 195 28 980 A1 | 2/1997 |
| DE | 198 35 622 A1 | 2/2000 |
| JP | 54064844 | 5/1979 |
| JP | 2000300501 | 10/2000 |

* cited by examiner

*Primary Examiner*—Mark Paschall
(74) *Attorney, Agent, or Firm*—Laurence A. Greenberg; Werner H. Stemer; Gregory L. Mayback (57) ABSTRACT

A method of and device for checking a device for influencing the temperature of a baking oven includes switching on devices for influencing the temperature of a baking oven for a predetermined time and subsequently comparing a measured temperature obtained with a predetermined comparison temperature. A fault signal is output dependent upon the comparison result.

20 Claims, 4 Drawing Sheets

METHOD OF CHECKING A DEVICE FOR INFLUENCING THE TEMPERATURE IN THE COOKING SPACE OF A BAKING OVEN AND CORRESPONDING BAKING OVEN

CROSS-REFERENCE TO RELATED APPLICATION

This application is a continuation of copending International Application No. PCT/EP01/07179, filed Jun. 25, 2001, which designated the United States and was not published in English.

BACKGROUND OF THE INVENTION

Field of the Invention:

The invention relates to a method of checking at least two devices for influencing the temperature in the cooking space of a baking oven, the devices being activated, and to a corresponding baking oven with at least two devices for influencing the temperature in the cooking space, with a control unit and with a temperature sensor for regulating the temperature in the cooking space, for which purpose the control unit is connected to the devices and the temperature sensor.

A general checking device and a general method of checking are disclosed in German Published, Non-Prosecuted Patent Application DE 198 35 622 A1, which describes a household appliance with at least two electrical heating elements and a resistance monitoring unit, which monitors the electrical resistance value while the heating element is switched on. In dependence on the actual resistance value of the heating element, a signal is automatically generated.

The prior art method and device are relatively complex because an electrical resistance has to be provided and, moreover, the actual value of the resistance has to be monitored and evaluated.

SUMMARY OF THE INVENTION

It is accordingly an object of the invention to provide a method of checking a device for influencing the temperature in the cooking space of a baking oven and corresponding baking oven that overcome the hereinafore-mentioned disadvantages of the heretofore-known devices and methods of this general type and that is of a more simple construction and less costly to produce.

With the foregoing and other objects in view, there is provided, in accordance with the invention, a method of checking at least two devices for influencing the temperature of a cooking space of a baking oven, including the steps of activating the devices in a test mode for a predetermined testing time, measuring the temperature in the cooking space of the baking oven, comparing the measured temperature with an associated comparison value, and generating a signal dependent upon a result of the comparison.

An advantage of the invention is that the at least two devices for influencing the temperature in the cooking space of a baking oven are operated in a test mode for a predetermined testing time and the temperature produced by the devices is measured and, in dependence on the value of the measured temperature, a signal is generated. As such, a temperature sensor that is usually present in any case for regulating the temperature of the cooking space can be used additionally for monitoring the functional capability of a number of devices, in particular, heating devices.

In accordance with another mode of the invention, the temperature difference that is produced by the activation of the device during the testing time is ascertained. Depending on the value of the temperature difference, a signal is generated. The temperature difference represents a more precise value for checking the correct functioning of the device because any influencing brought about by the ambient temperature is largely avoided in this way.

In accordance with an added mode of the invention, a number of devices that are integrated in the baking oven are checked one after the other for correct functioning. Such a procedure offers the advantage that all the devices of the baking oven are checked in a single test mode and, consequently, a statement on correct functioning of the household appliance can be made.

In accordance with a further mode of the invention, there are provided the steps of activating a number of the devices one after another over predetermined testing times, comparing each measured temperature with an associated comparison value, and generating a signal dependent upon a result of each comparison.

In accordance with an additional mode of the invention, there are provided the steps of activating the devices one after another over predetermined testing times, comparing at least one of each measured temperature and each temperature difference with comparison values, and generating a signal dependent upon a result of each comparison.

In accordance with yet another mode of the invention, there are provided the steps of activating the devices one after another over predetermined testing times, comparing at least one of each measured temperature and each temperature difference with the respective associated comparison value, and generating a signal dependent upon a result of each comparison.

In accordance with yet a further mode of the invention, the device is automatically checked at predetermined points in time or in predetermined operating states of the baking oven. Such a procedure offers the advantage that the checking of the device takes place continuously and independently of the input of an operator. As such, it is ensured that a malfunction of the baking oven is detected independently of the input by an operator.

In accordance with yet an added mode of the invention, the method is started through a data line from a central station at a remote location. As such, a remote diagnosis of the household appliance can be carried out. An advantageous development of the invention resides in the face that, during a normal operating mode of the baking oven, whether or not the temperature rise for this operating mode lies in a predetermined, characteristic range is monitored. If the rise is not in the range, the method of checking the device is started to characterize the fault more precisely.

In accordance with yet an additional mode of the invention, there is provided the step of waiting for a predetermined waiting time between the activation of two of the devices.

In accordance with again another mode of the invention, there is provided the step of utilizing the signal at least one of for indication of a fault and for diagnosis.

In accordance with again a further mode of the invention, there are provided the steps of operating one of the devices in a normal operating mode, measuring a temperature produced by the one device and comparing the measured temperature with a comparison value, and starting a test mode and checking the one device dependent upon a result of the comparison.

In accordance with again an added mode of the invention, there are provided the steps of respectively operating each one of the devices in a normal operating mode, measuring a temperature produced by each of the devices and comparing each measured temperature with a respective comparison value, and starting a test mode and checking the respective one of the devices dependent upon a result of each comparison.

With the objects of the invention in view, there is also provided a baking oven, including a housing defining a cooking space, at least two devices for influencing a temperature in the cooking space, a temperature sensor for regulating the temperature in the cooking space, a control unit for regulating the temperature in the cooking space, the control unit connected to the at least two devices and to the temperature sensor, and the control unit programmed to activate the at least two devices during a testing time, measure the temperature of the cooking space in the testing time through the temperature sensor, compare the measured temperature with a given comparison value, and generating a signal dependent upon a result of the comparison.

In accordance with again an additional feature of the invention, the control unit is programmed to ascertain a temperature difference produced by an activation of one of the at least two devices during the testing time, compare the ascertained temperature difference with a second given comparison value, and generate a signal dependent upon a result of the comparison. Preferably, the second given comparison value is the given comparison value.

In accordance with still another feature of the invention, the control unit is programmed to ascertain a temperature difference produced by an activation of each of the at least two devices during the testing time, compare the ascertained temperature difference with a respective one of a plurality of given comparison values, and generate a signal dependent upon a result of the comparison.

In accordance with still a further feature of the invention, the at least two devices is a plurality of devices and the control unit is programmed to activate each of the devices one after another for a respective testing time, and after each respective testing time at least one of measure the temperature and ascertain the temperature difference produced by the activation of a respective one of the devices and generate a signal dependent upon a value of at least one of the measured temperature and the ascertained temperature difference.

In accordance with a concomitant feature of the invention, at least one of the devices is a heating unit and/or a cooling unit. Preferably, the cooling unit is a blower.

Other features that are considered as characteristic for the invention are set forth in the appended claims.

Although the invention is illustrated and described herein as embodied in a method of checking a device for influencing the temperature in the cooking space of a baking oven and corresponding baking oven, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
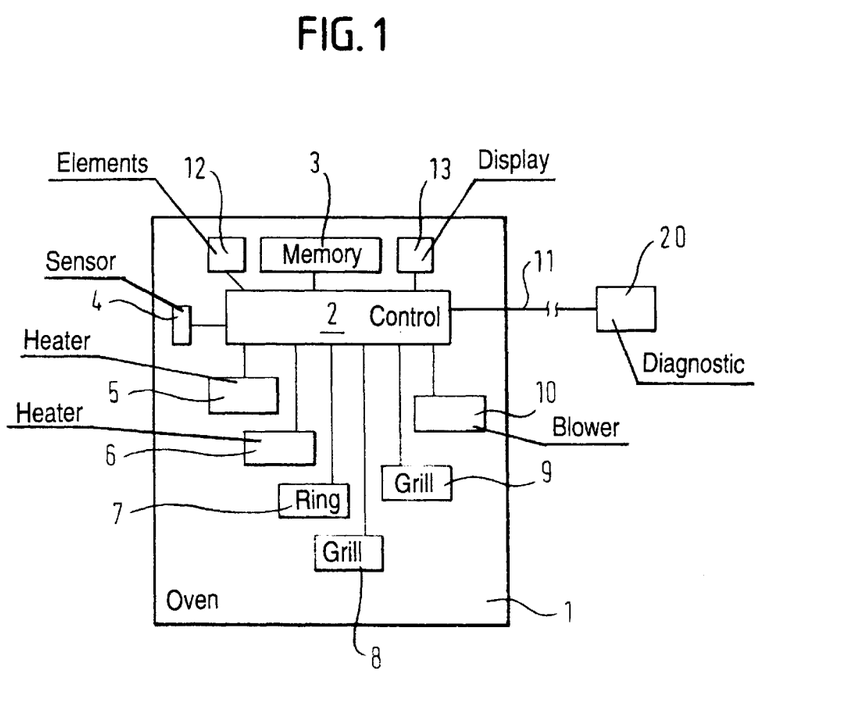
FIG. 1 is a block circuit diagram of a baking oven according to the invention.

Referring now to the figures of the drawings in detail and first, particularly to FIG. 1 thereof, there is shown a baking oven 1, which has a control device 2 that is connected through lines to a memory 3, a temperature sensor 4, a small unit for heating from below 5, a large unit for heating from below 6, a heating ring 7, an outer grilling unit 8, an inner grilling unit 9, and a circulating-air blower 10. The temperature sensor 4 in this case senses the temperature of the cooking space in a conventional way for regulating the temperature by the control device 2 with the heating units. Furthermore, the control device 2 has an interface 11, through which a data line can be connected to the control device 2. For example, an external diagnosis device 20 can be connected to the interface 11. The small and large units for heating from below 5, 6 are configured in the form of heating elements in the lower region of a baking oven. The small unit 5 for heating from below has a smaller maximum heating power than the large unit 6 for heating from below. The inner and outer grilling units 8, 9 are disposed as heating elements in the upper region of the baking space. The inner grilling unit has a greater maximum power than the outer grilling unit. The heating ring 7 is disposed in the form of a heating element on a rear wall of the oven, which is disposed opposite the non-illustrated oven door.

The baking oven 1 also has a display panel 13, which is connected to the control device 2. Furthermore, operator control elements 12 are provided, with which an operator can, for example, set a desired temperature of the baking oven and/or a predetermined program for baking a specific item.

The operator control elements 12 are, likewise, connected to the control device 2.

The operator control elements 12 can be used, for example, by inputting a predetermined combination of keys or setting a predetermined position of the operator control elements 12, for initiating the start of the method according to the invention of checking the devices for influencing the temperature.

Control programs are stored in the memory 3. Based upon the control programs, the control device 2 activates the device in dependence on predetermined data to set a desired temperature in the baking oven and carry out a desired baking operation. The small unit for heating from below 5, the large unit for heating from below 6, the heating ring 7, the outer grilling unit 8, the inner grilling unit 9, and the circulating-air blower 10 represent devices for influencing the temperature of the baking oven 1.

The way in which the baking oven 1 functions is explained in more detail below based upon the flow diagram of FIGS. 2 and 3.

Figure 2:
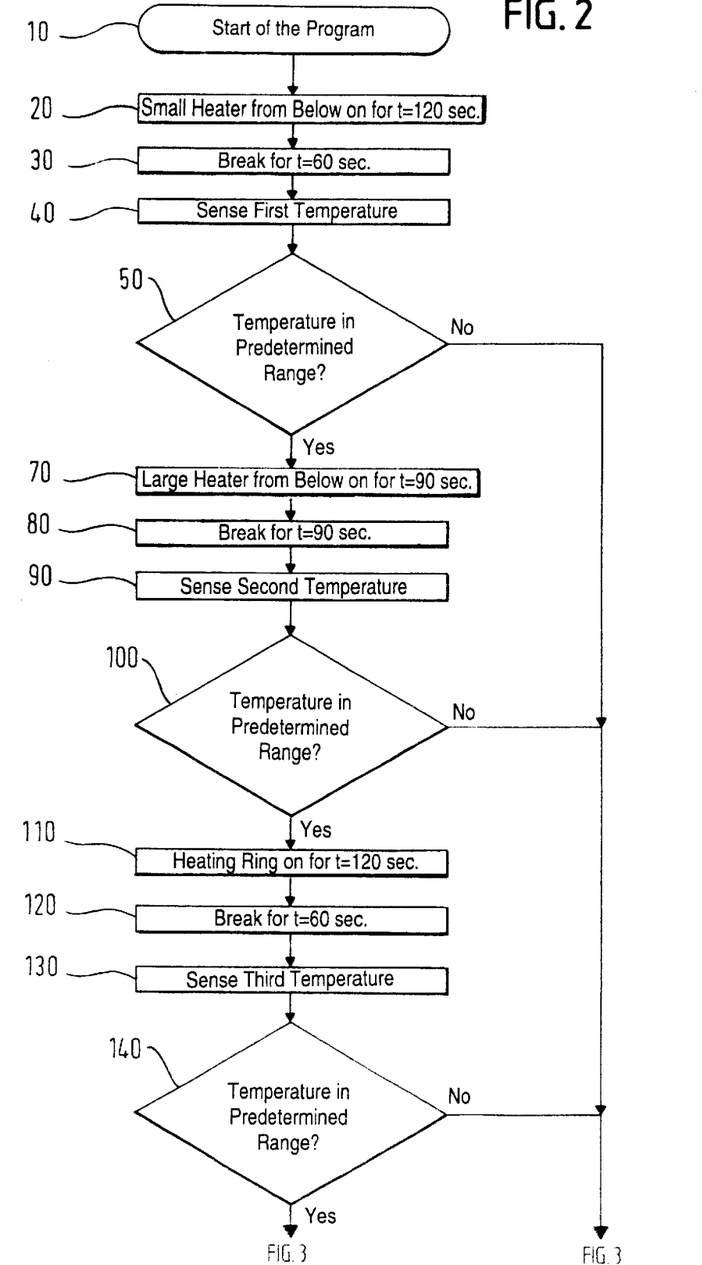
FIG. 2 is a first part of a flow chart for carrying out the method according to the invention.
Figure 3:
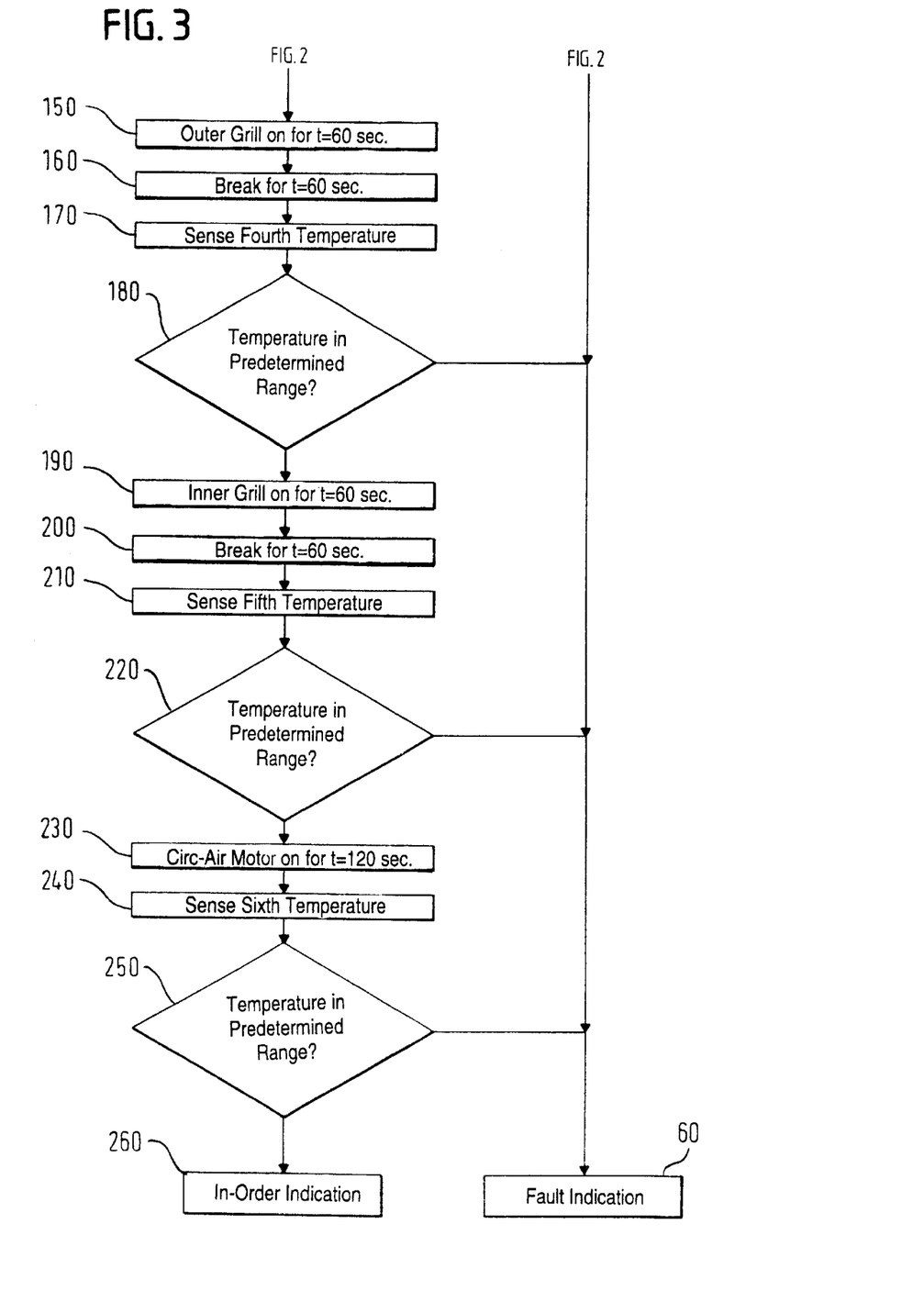
FIG. 3 is a second part of a flow chart for carrying out the method according to the invention.

FIGS. 2 and 3 show a flow diagram for checking the devices for influencing the temperature of the baking oven.

At step 10, the method is started by the input of a specific combination of keys. After that, at step 20, the small unit for heating from below 5 is switched on by the control device 2 for a predetermined first testing time of 120 sec. Once the first testing time has elapsed, a predetermined first waiting time of 60 sec is allowed to pass at step 30. Subsequently, at step 40, the control device 2 measures the temperature in the baking oven 1, with the temperature sensor 4, as a first temperature. Subsequently, at step 50, the control device 2 compares the measured first temperature with a first temperature range stored in the memory 3. If the comparison shows that the first temperature does not lie within the first temperature range, the branch to step 60 is taken (FIG. 3). If the check at step 50 shows that the first temperature lies in the first temperature range, the branch to step 70 is taken.

At step 70, the control device 2 switches on the large unit for heating from below 6 for a predetermined second testing time of 90 sec. Once the second testing time has elapsed, a second waiting time of 90 sec is allowed to pass at the following step 80 before the control device 2 senses the temperature in the oven as the second temperature at the following step 90. Subsequently, at the following step 100, the control device 2 compares whether or not the second temperature lies within a second predetermined temperature range. If the inquiry at step 100 shows that the second temperature lies outside the second temperature range, the branch to step 60 is taken (FIG. 3). If the comparison at step 100 shows that the second temperature lies within the second temperature range, the branch to step 110 is taken.

At step 110, the control device 2 switches on the heating ring 7 for a third testing time of 120 sec. Once the third testing time has elapsed, a third waiting time of 60 sec is allowed to pass at the following step 120 before the control device 2 senses the temperature in the oven as the third temperature at the following step 130. Subsequently, at step 140, the control device 2 checks whether or not the third temperature lies within a third predetermined temperature range. If the third temperature lies outside the third temperature range, the branch to step 60 is taken. If the inquiry at step 140 shows that the third temperature lies within the third temperature range, the branch to step 150 is taken.

The further sequence of the program is represented in FIG. 3.

At step 150, the control device 2 switches on the outer grilling unit 8 for a predetermined fourth testing time of 60 sec. After the third testing time has elapsed, the control device 2 waits for a predetermined fourth waiting time of 60 sec at the following step 160 in order, subsequently, to sense the temperature in the oven as the fourth temperature at the following step 170.

After that, the test device 2 checks at step 180 whether or not the fourth temperature lies in a predetermined fourth temperature range. If the comparison at step 180 shows that the fourth temperature lies outside the predetermined fourth temperature range, the branch to step 60 is taken. If the comparison at step 180 shows that the fourth temperature lies within the fourth temperature range, the branch to step 190 is taken. At step 190, the control device 2 switches on the inner grilling unit 9 for a predetermined fifth testing time of 60 sec. Once the fifth testing time has elapsed, the control device 2 waits for a predetermined fifth waiting time of 60 sec at the following step 200 before the control device 2 senses the temperature in the oven as the fifth temperature at the following step 210. Subsequently, at the following step 220, the control device compares whether or not the fifth temperature lies in a predetermined fifth temperature range.

If this is not the case, the branch to step 60 is taken. If, however, the comparison at step 220 shows that the fifth temperature lies in the fifth temperature range, the branch to step 230 is subsequently taken.

At step 230, the control device 2 switches on the circulating-air blower 10 for a predetermined sixth testing time of 120 sec. Once the sixth testing time has elapsed, the control device measures at step 240 the temperature in the oven as the sixth temperature. At the following step 250, the control device 2 compares whether or not the sixth temperature lies in a predetermined sixth temperature range. If this is not the case, the branch to step 60 is taken. If the inquiry at step 250 shows that the sixth temperature lies within the sixth temperature range, the branch to step 260 is taken.

At step 260, the control device 2 generates a signal that indicates that all the checked devices for influencing the temperature are functioning correctly. This signal is output, for example, as an optical signal through a display panel 13.

At step 60, the control device 2 generates a fault signal, which is either stored in the memory 3 and/or is output through the display panel 13 as an optical fault signal and/or is emitted through the interface 11.

In a simple embodiment, temperature values that represent a lower limit or an upper limit for the temperature of the household appliance are used instead of the temperature ranges as comparison values. If the comparison shows that the measured temperature lies below the lower limit or above the upper limit, inadequate power or excessive power of the checked device is detected.

The values for the first, second, third, fourth, fifth, and sixth testing times and the values for the first, second, third, fourth, and fifth waiting times and the values for the first, second, third, fourth, fifth, and sixth temperature ranges are stored in the memory 3.

In a development of the invention, when a device is being checked, the control device 2 ascertains the temperature difference that is produced by operating the device for influencing the temperature and the temperature difference produced is compared with a corresponding predetermined temperature range, which is stored in the memory 3. As such, precise checking of the correct functioning of the devices is made possible because temperature influences from the ambience are filtered out. The use of temperature differences allows more precise temperature ranges to be chosen as comparative values because deviations of the individual devices cannot accumulate.

The invention has been described based upon the flow diagram of FIGS. 2 and 3, in which a number of devices were checked one after the other for correct functioning. In a simple way of implementing the invention, the individual devices may also be checked independently of one another and individually. A different sequence of the devices during checking is also possible.

The checking of the devices is, preferably, carried out at regular time intervals or in dependence on predetermined operating states of the household appliance. For example, in the case of a baking oven, the program for checking the devices is started at the beginning of a pyrolysis mode.

In a preferred embodiment, the method according to the invention of checking the devices is started by a data input through the interface 11. In such a case, the interface 11 may be in connection with a portable diagnosis device, which is connected directly to the baking oven 1, or through an Internet link with a customer service center at a remote location, which carries out a remote diagnosis of the baking oven 1.

In a preferred embodiment, during a normal operating mode of the baking oven, the temperature rise for this operating mode is compared with a stored comparison temperature rise and the method of checking the devices is started when the temperature rise deviates more than a predetermined value from the comparison temperature rise. As such, if a malfunction occurs, a diagnosis of the household appliance is carried out immediately. As a result, more precise information on the malfunction is obtained and/or emergency operation by a standby device is started.

Figure 4:
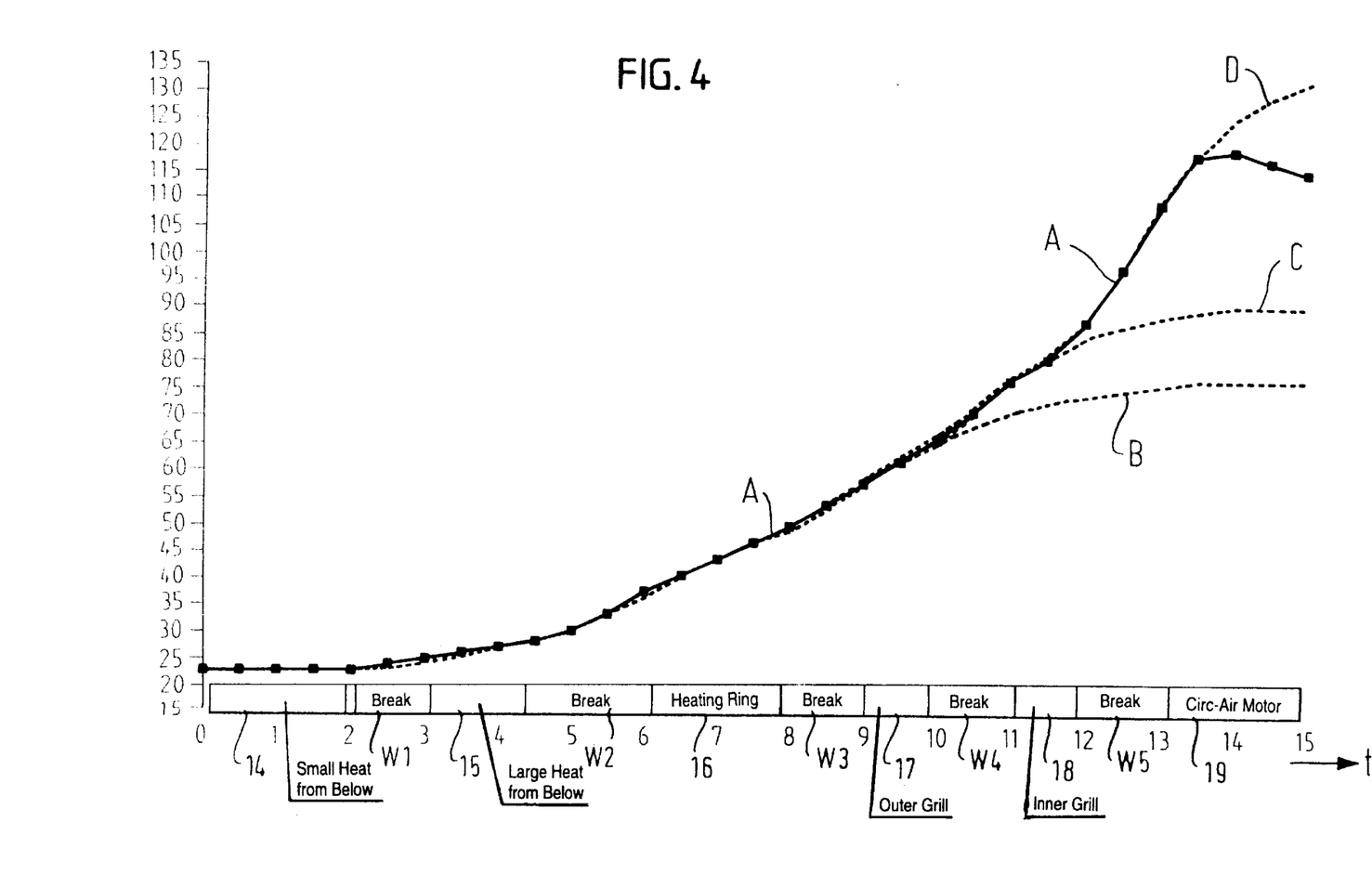
FIG. 4 is a graph indicating a temperature characteristic of a test mode of the baking oven according to the invention.

FIG. 4 shows a diagram in which a first temperature characteristic A is plotted over time t. Represented along the time axis are the time ranges in which the individual devices are operated or the control device waits for the waiting times. In the representation, the waiting times are designated by a break. The time is plotted in minutes. The first characteristic A represents the mean value of the temperature ranges that are used for the comparison with the measured temperature values. The temperature ranges have predetermined values of from ±3° to 10° with respect to the first characteristic A. The deviations depend on the devices that are being checked and were ascertained experimentally.

Indicated along the time axis are various operating states of the baking oven 1. During a first operating state 14, the small unit for heating from below 5 is switched on; during a second operating state 15, the large unit for heating from below 6 is switched on; during a third operating state 16, the heating ring 7 is switched on; during a fourth operating state 17, the outer grilling unit 8 is switched on; during a fifth operating state 18, the inner grilling unit 9 is switched on; and, during a sixth operating state 19, the circulating-air blower 10 is switched on. The first, second, third, fourth, and fifth waiting times W1, W2, W3, W4 and W5 are disposed between the individual operating states.

In FIG. 4, a second characteristic B is represented, this characteristic separating from the characteristic A approximately at the point in time of ten minutes. The second characteristic B represents the temperature development without an outer grilling unit 8 and an inner grilling unit 9 and without a circulating-air blower 10.

Moreover, a third characteristic C is represented, this characteristic separating from the first characteristic A at a point in time of approximately 11.5 minutes and representing the temperature development that occurs without an inner grilling device 9.

Furthermore, a fourth characteristic D is represented, this characteristic separating from the first characteristic A at a point in time of 13 minutes. The fourth characteristic D describes the temperature development that occurs without switching on a circulating-air blower 10.

If the measured temperature of the oven deviates from the first characteristic A by a predetermined value, the control device 2 detects a malfunction. Depending on the operating state in which the deviation occurs, the control device 2 also detects which device has a malfunction. This information can be displayed, stored, or output through the interface 11.

With the aid of the method described, a large number of devices of a household appliance can be checked one after the other for a malfunction and, consequently, a complete diagnosis of a household appliance can be carried out within an extremely short time. The invention is not restricted to the household appliance specified in the exemplary embodiment described, in the form of a baking oven, but may also be applied to all types of household appliances in which devices are used for heating or cooling a household appliance. For example, application to a cooktop of a cooker or to a refrigerator is also possible.

The sequence in which the devices are checked one after the other may be chosen by a person skilled in the art according to the application. Preferably, the devices that bring about a small change in the temperature are checked first, at the beginning. Such a check has the effect that a more precise result is obtained because, in the case of devices that bring about only a small change in the temperature, the permissible range of variation of the temperature that occurs during normal functioning is also small. In contrast, in the case of devices that produce a large change in the temperature, the range of variation of the temperature is also greater so that a device with a small change in temperature may exhibit less of a change in temperature than the range of variation of a device with a large change in temperature. Consequently, a reliable statement on a device with a small change in temperature can scarcely be made if it is checked after a device with a large change in temperature. The values for the testing times, the waiting times, and the temperature ranges for the comparison with the measured temperature are individually chosen and optimized by a person skilled in the art according to the application and the household appliance.

We claim:

1. A method of checking at least two devices for influencing the temperature of a cooking space of a baking oven, which comprises:

activating the devices in a test mode for a predetermined testing time;

measuring the temperature in the cooking space of the baking oven;

comparing the measured temperature with an associated comparison value;

generating a signal dependent upon a result of the comparisons;

respectively ascertaining a temperature difference produced by activation of each of the devices;

comparing each temperature difference ascertained with a respective associated comparison value; and generating a signal dependent upon a result of each comparison.

2. A method of checking at least two devices for influencing the temperature of a cooking space of a baking oven, which comprises:

activating the devices in a test mode for a predetermined testing time;

measuring the temperature in the cooking space of the baking oven;

comparing the measured temperature with an associated comparison value;

generating a signal dependent upon a result of the comparison;

activating a number of the devices one after another over predetermined testing times;

comparing each measured temperature with an associated comparison value; and generating a signal dependent upon a result of each comparison.

3. The method according to claim 1, which further comprises:

activating the devices one after another over predetermined testing times;

comparing at least one of each measured temperature and each temperature difference with comparison values; and generating a signal dependent upon a result of each comparison.

4. The method according to claim 1, which further comprises:
activating the devices one after another over predetermined testing times;
comparing at least one of each measured temperature and each temperature difference with the respective associated comparison value; and
generating a signal dependent upon a result of each comparison.

5. A method of checking at least two devices for influencing the temperature of a cooking space of a baking oven, which comprises;
activating the devices in a test mode for a predetermined testing time;
measuring the temperature in the cooking space of the baking oven;
comparing the measured temperature with an associated comparison value;
generating a signal dependent upon a result of the comparison; and
automatically starting the activating, measuring, comparing, and generating steps at predetermined points in time.

6. A method of checking at least two devices for influencing the temperature of a cooking space of a baking oven, which comprises:
activating the devices in a test mode for a predetermined testing time;
measuring the temperature in the cooking space of the baking oven;
comparing the measured temperature with an associated comparison value;
generating a signal dependent upon a result at the comparison; and
automatically starting the activating, measuring, comparing, and generating steps in predetermined operating states of the baking oven.

7. A method of checking at least two devices for influencing the temperature of a cooking space of a baking oven, which comprises:
activating the devices in a test mode for a predetermined testing time;
measuring the temperature in the cooking space of the baking oven;
comparing the measured temperature with an associated comparison value;
generating a signal dependent upon a result of the comparison; and
at least one of starting and evaluating the activating, measuring, comparing, and generating steps through a data line from an external diagnosis device.

8. The method according to claim 2, which further comprises waiting for a predetermined waiting time between the activation of two of the devices.

9. The method according to claim 3, which further comprises waiting for a predetermined waiting time between the activation of two of the devices.

10. The method according to claim 4, which further comprises waiting for a predetermined waiting time between the activation of two of the devices.

11. A method of checking at least two devices for influencing the temperature of a cooking space of a baking oven, which comprises:
activating the devices in a test mode for a predetermined testing time;
measuring the temperature in the cooking space of the baking oven;
comparing the measured temperature with an associated comparison value;
generating a signal dependent upon a result of the comparison; and
utilizing the signal at least one of for indication of a fault and for diagnosis.

12. A method of checking at least two devices for influencing the temperature of a cooking space of a baking oven, which comprises:
activating the devices in a test mode for a predetermined testing time;
measuring the temperature in the cooking space of the baking oven;
comparing the measured temperature with an associated comparison value;
generating a signal dependent upon a result of the comparison; and
operating one of the devices in a normal operating mode;
measuring a temperature produced by the one device and comparing the measured temperature with a comparison value; and
starting a test mode and checking the one device dependent upon a result of the comparison.

13. A method of checking at least two devices for influencing the temperature of a cooking space of a baking oven, which comprises:
activating the devices in a test mode for a predetermined testing time;
measuring the temperature in the cooking space of the baking oven;
comparing the measured temperature with an associated comparison value;
generating a signal dependent upon a result of the comparison; and
respectively operating each one of the devices in a normal operating mode;
measuring a temperature produced by each of the devices and comparing each measured temperature with a respective comparison value; and
starting a test mode and checking the respective one of the devices dependent upon a result of each comparison.

14. A baking oven, comprising:
a housing defining a cooking space;
at least two devices for influencing a temperature in said cooking space;
a temperature sensor for regulating the temperature in the cooking space;
a control unit for regulating the temperature in the cooking space, said control unit connected to said at least two devices and to said temperature sensor; and
said control unit programmed to:
activate said at least two devices during a testing time;
measure the temperature of the cooking space in said testing time through said temperature sensor;
compare the measured temperature with a given comparison value and generate a signal dependent upon a result of the comparison;
ascertain a temperature difference produced by an activation of one of said at least two devices during said testing time; and compare the ascertained temperature difference with a second given comparison value and generate a signal dependent upon a result of the comparison.

15. The baking oven according to claim 14, wherein said second given comparison value is said given comparison value.

16. A baking oven, comprising:

a housing defining a cooking space;

at least two devices for influencing a temperature in said cooking space;

a temperature sensor for regulating the temperature in the cooking space;

a control unit for regulating the temperature in the cooking space, said control unit connected to said at least two devices and to said temperature sensor; and said control unit programmed to:
 activate said at least two devices during a testing time;
 measure the temperature of the cooking space in said testing time through said temperature sensor;
 compare the measured temperature with a given comparison, value and generate a signal dependent upon a result of the comparison;
 ascertain a temperature difference produced by an activation of each of said at least two devices during said testing time; and
 compare the ascertained temperature difference with a respective one of a plurality of given comparison values and generate a signal dependent upon a result of the comparison.

17. The baking oven according to claim 14, wherein:

said at least two devices is a plurality of devices; and said control unit is programmed to:
 activate each of said devices one after another for a respective testing time; and
 after each respective testing time:
  at least one of measure the temperature and ascertain the temperature difference produced by the activation of a respective one of said devices; and
  generate a signal dependent upon a value of at least one of the measured temperature and the ascertained temperature difference.

18. The baking oven according to claim 14, wherein at least one of said at least two devices is a heating unit.

19. The baking oven according to claim 14, wherein at least one of said at least two devices is a cooling unit.

20. The baking oven according to claim 19, wherein said cooling unit is a blower.

* * * * *